United States Patent [19]

Conrads et al.

[11] Patent Number: 5,341,409
[45] Date of Patent: Aug. 23, 1994

[54] METHOD OF GENERATING X-RAY IMAGES AND DEVICE SUITABLE FOR CARRYING OUT THE METHOD

[75] Inventors: Norbert Conrads, Hauset, Belgium; Walter Hillen, Aachen, Fed. Rep. of Germany; Hanns-Ingo Maack, Norderstedt, Fed. Rep. of Germany; Stephan Rupp, Stuttgart, Fed. Rep. of Germany; Ingo Schäfer, Kiel, Fed. Rep. of Germany; Ulrich Schiebel, Aachen, Fed. Rep. of Germany

[73] Assignee: U.S. Philips Corporation, New York, N.Y.

[21] Appl. No.: 20,499

[22] Filed: Feb. 22, 1993

[30] Foreign Application Priority Data

Feb. 22, 1992 [DE] Fed. Rep. of Germany ....... 4205566

[51] Int. Cl.$^5$ ............................................. B41M 5/00
[52] U.S. Cl. ................................... 378/29; 378/28
[58] Field of Search ................................. 378/28, 29

[56] References Cited

U.S. PATENT DOCUMENTS

| | | |
|---|---|---|
| 4,134,018 | 1/1979 | Weinkauf et al. |
| 4,939,759 | 7/1990 | Rupp et al. ................. 378/29 |
| 5,097,493 | 3/1992 | Hillen et al. ................. 378/99 |
| 5,162,850 | 11/1992 | Nakashima ................. 355/308 |

FOREIGN PATENT DOCUMENTS

| | | |
|---|---|---|
| 0219897 | 4/1987 | European Pat. Off. |
| 4004348 | 8/1991 | Fed. Rep. of Germany |

OTHER PUBLICATIONS

"Proceedings of SPIE" vol. 626, 1986, pp. 176–184.

*Primary Examiner*—Craig E. Church
*Attorney, Agent, or Firm*—Jack D. Slobod

[57] ABSTRACT

The invention relates to a method of generating X-ray images by means of a photoconductor which is provided on a conductive substrate and whose surface potential can be read by means of probes, and also relates to a device suitable for carrying out the method. In order to avoid image artefacts which could be caused by deviating sensitivities of the probes or by frequency-dependent distortions, after the charging of the photoconductor the substrate potential is varied during a test phase. Test data is generated which correspond to the spatial or temporal variation of the potential on the surface of the photoconductor; from this test data there is formed correction data which is stored in order to correct the image data of a subsequent X-ray exposure.

7 Claims, 2 Drawing Sheets

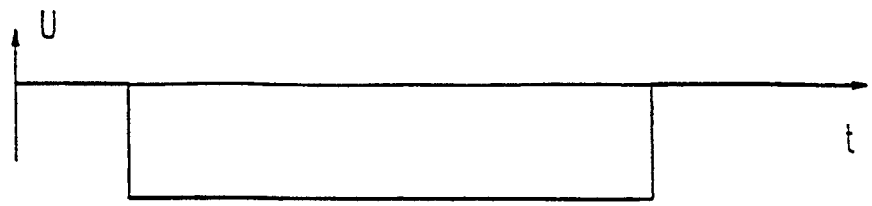
FIG. 2a
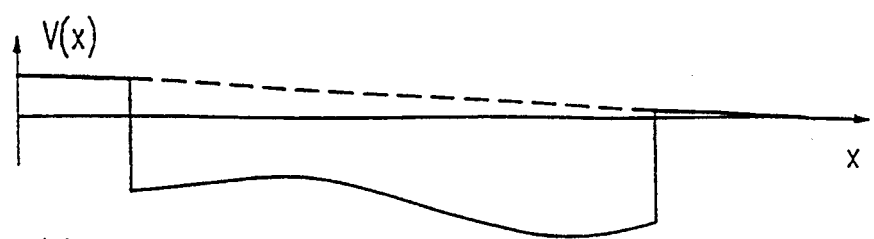
FIG. 2b
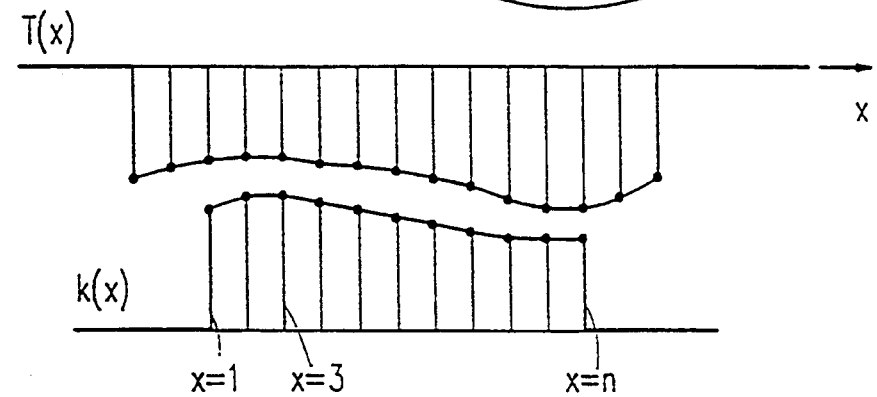
FIG. 2c
FIG. 2d
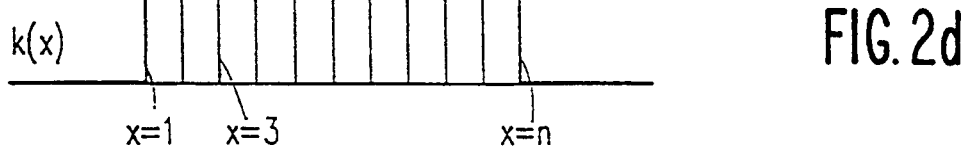
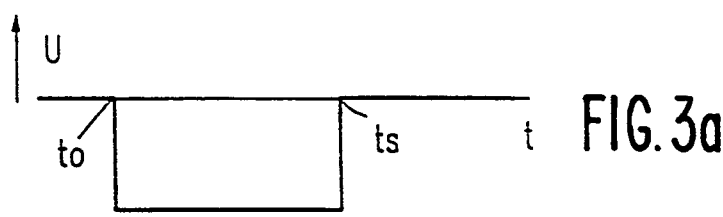
FIG. 3a
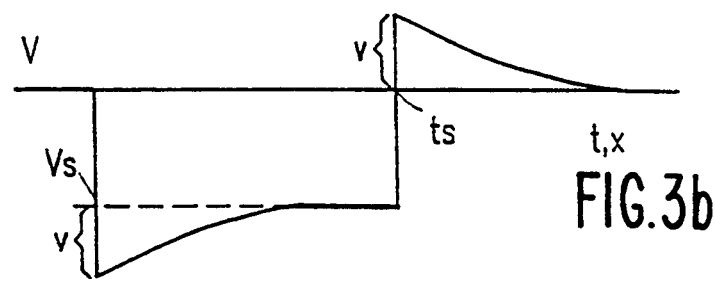
FIG. 3b
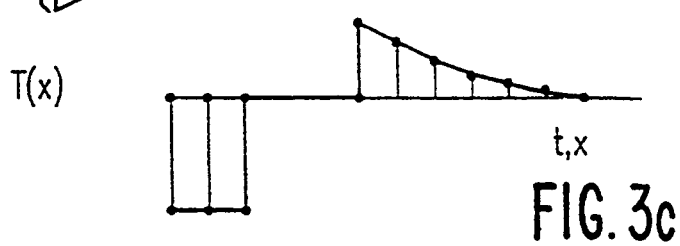
FIG. 3c

METHOD OF GENERATING X-RAY IMAGES AND DEVICE SUITABLE FOR CARRYING OUT THE METHOD

BACKGROUND OF THE INVENTION

1. Field of the Invention

The invention relates to a method of generating X-ray images by means of a photoconductor which is provided on a conductive substrate and whose surface potential can be read by means of probes, and also relates to a device suitable for carrying out such a method.

2. Description of the Related Art

A method and device of this kind are known from the publication "Proceedings of SPIE", Vol. 626, 1986, pp. 176–184 as well as from DE-OS 40 04 348 which corresponds to U.S. Pat. No. 5,097,493. Therein, the surface potential of the surface potential of the photoconductor is read by means of a probe device. The probes could be situated at different distances from the surface of the photoconductor and these distances could fluctuate during the reading of the photoconductor. If no steps are taken, this will cause artifacts in the X-ray image reconstructed by means of the image data supplied by the probes. To this end, during the read-out operation the distance between the probes and the surface of the photoconductor is continuously determined by applying an alternating voltage to the substrate. This alternating voltage is capacitively applied to the probes which thus supply an alternating voltage signal whose amplitude is a measure of the probe distance.

In the method described in "Proceedings of SPIE", supra, the dependency on distance of the amplitude of the alternating voltage is utilized to generate correction data which is applied to the image data so as to compensate for the distance fluctuations and to suppress the associated artefacts. In the method described in DE-OS 40 04 348, however, the probes are moved in the direction perpendicular to the photoconductor in dependence on the signal amplitudes measured so that the distance remains substantially constant.

In order to avoid mutual influencing of the image signals on the one hand and the alternating voltage signals on the other hand, the frequency of the alternating voltage must be substantially higher than that of the image signals. Therefore, the image signals and the alternating voltage are separated and processed in two channels by suitable filters.

SUMMARY OF THE INVENTION

It is an object of the present invention to provide a method of generating X-ray images enabling a reduction of the image artifacts by using simple means.

This object is achieved in accordance with the invention in that the method comprises steps of:
a) charging the photoconductor to a defined potential
b) varying the substrate potential and read-out the potential variation thus caused on the photoconductor surface
c) generating test data which correspond to the spatial and/or temporal variation of the potential on the surface of the photoconductor
d) determining correction data which compensate for the deviation of the test data from its ideal value
e) storing the correction data
f) processing the image data of subsequent X-ray exposures while taking into account the correction data.

The invention is based first of all on the observation that in a configuration defined by a photoconductor and a probe arrangement, the image artefacts recur in respect of type and magnitude in successive X-ray images. Therefore, the corrections for an X-ray image need not be determined simultaneously with the image data for this X-ray image, but can be determined in advantage, stored and used for the correction of subsequent X-ray images. In the ideal case the correction data need be determined only once. In practical circumstances, however, it is more effective to determine the correction data more often, for example once a day.

The invention is also based on the consideration that a variation of the substrate potential, after the charging of the photoconductor, induces a variation of the potential across the entire surface of the photoconductor. The variation of the substrate potential thus has the same effect as a test X-ray exposure during which the photoconductor surface is uniformly exposed. Such a uniform exposure is difficult to achieve in practice, and the invention replaces the generation of the X-rays by the variation of the substrate potential. In accordance with the invention, the variation of the probe signals caused by the variation of the substrate pontential is detected as a function of time and/or the location on the photoconductor surface. In the ideal case, the test data supplied by reading-out the photoconductor during such a test should vary exactly in proportion to the variation of the substrate potential, i.e. with the same proportionality factor for all probes and for all pixels on the surface of the photoconductor. However, in practice deviations occur between this ideal variation and the variation determined by the probes. Correction data for compensating the deviations can be derived from these deviations. This correction data is stored and used for subsequent X-ray exposures in order to correct the image data.

The invention enables compensation not only for different sensitivities of different probes or for the location-dependent fluctuating sensitivity of a probe, but also for frequency-dependent signal deformations where variation in time of the signals supplied by the probes does not exactly correspond to the variation of the substrate potential.

In a preferred version of the invention, suitable to compensate for different sensitivities of different probes or for the location-dependent sensitivity variations of the individual probes, the following steps are taken: a) varying the substrate potential by a constant amount b) forming correction factors for pixels on the photoconductor surface in dependence on the quotient of a reference value, being the same for all pixels, and the test data c) applying the associated correction value to the image data read after an X-ray exposure so that there is obtained corrected image data which is proportional to the image data and inversely proportional to the test data.

The steps a) and b) are repeated, if necessary, for further lines after resetting of the substrate potential to its original value. The variation of the substrate potential by a constant amount causes the same variation of the potential on the photoconductor surface as a test X-ray exposure with uniform exposure of all pixels of the photoconductor. In the ideal case all probes should then supply the same signal amplitude for all pixels on the photoconductor surface. However, in practice this condition is not satisfied and the test data deviates from one probe to another and from one pixel to another. The value of the test data determined for the various pixels is a measure for the probe sensitivity at the relevant pixel. Therefore, from the test data there can be derived correction factors which are applied to the image data during a later X-ray exposure so that the corrected image data is inversely proportional to the test data and proportional to the non-corrected image data.

It would then in principle be necessary to store a correction factor for each pixel, so that the memory provided for this purpose should have the same capacity as an image memory. In a preferred embodiment this capacity can be reduced in that for each probe the correction factors are determined and stored for at least one line, of an X-ray image, the image data of all lines read by said probes being subjected to the correction factors derived from the stored correction factors. This embodiment is particularly suitable for a photoconductor which is shaped as a cylindrical surface and comprising a plurality of probes which are offset in the direction parallel to the axis of the photoconductor and which scan the surface potential of the photoconductor along circular or helical lines. However, it can also be used for other configurations in which the probe sensitivity fluctuation in the line direction is substantially higher than that in the direction perpendicular thereto. Therefore, it suffices to determine the correction factors for only one or two lines and to derive the correction factors for the other lines read-out by means of the same probe.

It has been found that given constructions of probes reproduce the variation in time of the surface potential in a distorted manner only. In addition to a signal component corresponding to the variation of the photoconductor potential, they supply a component which corresponds to the differential quotient of this potential in time.

In a further embodiment of the invention such signal distortion can also be eliminated in that the substrate potential is varied in a step-line manner by a constant amount after the charging (and during the reading of a line by the probes), filter coefficients for a digital filtering operation being determined from the magnitude and the variation of the test data thus obtained at successive sampling instants, the filter coefficients being stored and the image data of all lines read by the same probe being subjected, during a subsequent X-ray exposure, to a filtering operation taking into account the stored filter coefficients.

A device capable of reducing the artefacts in an X-ray image by means of the correction data determined by variation of the substrate potential is characterized in that there is provided a memory in which correction factors are stored, the image processing unit being constructed so that the correction factors are applied to the image data of an X-ray image in order to reduce artifacts. However, this requires an extremely high temporal and mechanical stability of the parameters determining the transfer behaviour of the probes. An embodiment which is suitable for eliminating the artefacts also when said conditions are not satisfied is characterized in that it comprises means for varying the substrate potential by a constant amount and means for forming correction data from the test data supplied by the probe device upon variation of the substrate potential.

BRIEF DESCRIPTION OF THE DRAWING

The invention will be described in detail hereinafter with reference to the drawing. Therein:

FIGS. 2a to 2d show the variation in time and in space of various signals in conjunction with the determination of the correction factors, FIGS. 3a to 3c show the variation in time and in space of various signals during the determination of the filter coefficients.

DETAILED DESCRIPTION OF THE PREFERRED EMBODIMENTS

Figure 1:
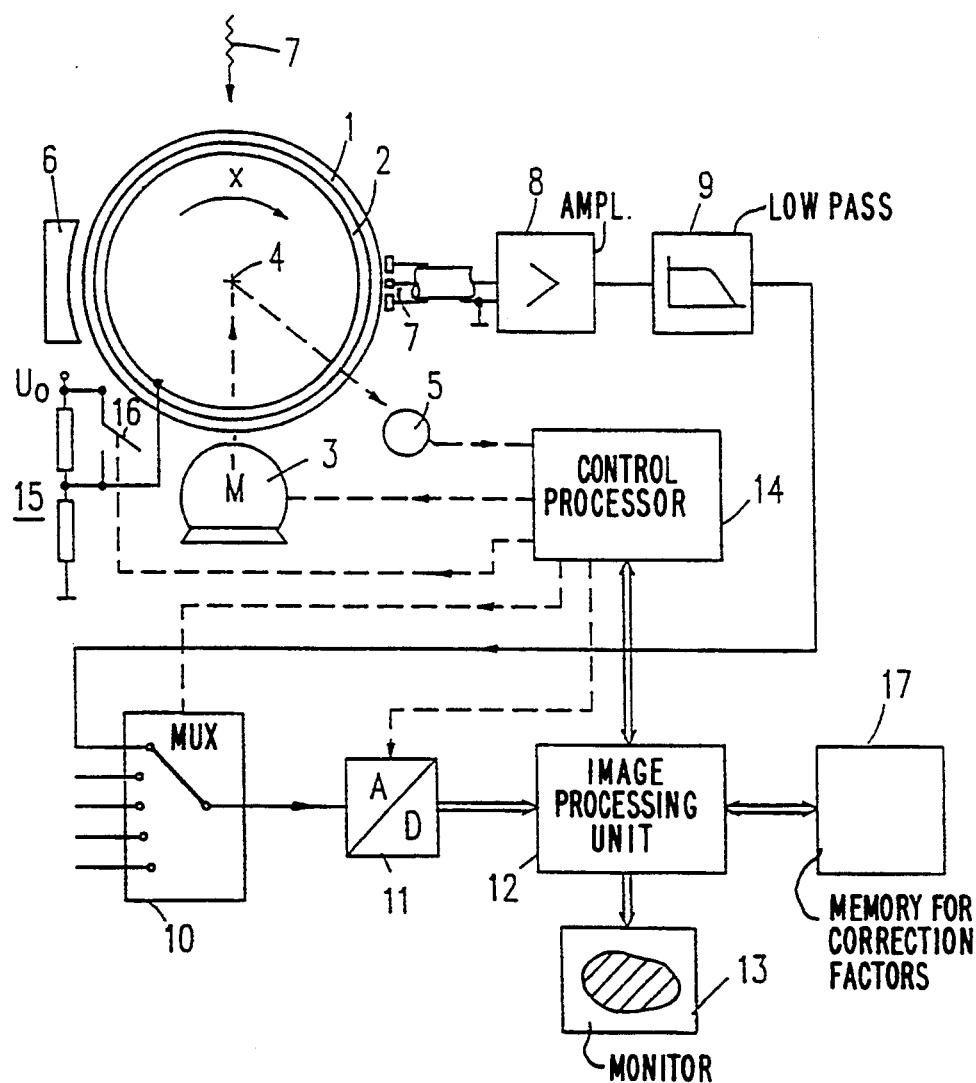
FIG. 1 shows a device which is suitable for carrying out the method in accordance with the invention.

FIG. 1 shows a photoconductor 1 which is provided as a selenium layer having a thickness of approximately 0.5 mm on a conductive substrate in the form of an aluminium cylinder 2. A motor 3 enables rotation of the photoconductor device 1, 2 about its cylinder axis 4 extending perpendicularly to the plane of drawing. The angular position of the photoconductor device 1, 2 is measured by means of a suitable angle detector 5. A voltage $U_o$ of, for example $-1500$ V can be applied to the substrate 2. A corona charging device 6 serves to charge, prior to an exposure, the rotating drum uniformly to a potential of 0 V across its surface, so that a voltage of 1500 V is present across the selenium layer 1. As is symbolically denoted by the reference 7, the drum can be exposed (after the charging operation) to an X-ray image.

Depending on the intensity, the X-rays change the conductivity of the selenium layer more or less in a location-dependent manner, causing a corresponding discharge of the surface. As a result, the surface potential changes. The change of the surface potential is detected by means of a probe device which comprises a number of probes, for example 32, only one probe 7 being shown in the drawing. The probes are adjacently arranged in an offset manner in the direction of the axis 4 and detect the potential in adjacently situated, ring-shaped surface areas of the photoconductor 1. During this scanning operation the drum rotates and at the same time the probes are displaced together in the direction of the axis, that is to say each time over one pixel per revolution of the photoconductor device 1, 2. Displacement can take place step-wise but preferably continuously, so that said areas are scanned along circular or spiral-shaped or helical lines.

The line direction will be referred to hereinafter as the x direction and the direction substantially perpendicular thereto, coincident with the direction of the cylinder axis 4, will be denoted by the reference y.

Each probe signal is processed in an analog manner in a separate channel, i.e. by the units 8 and 9 which perform an amplification and low-pass filtering operation. The analog output signals of the individual channels, only one of which is shown in FIG. 1, are applied to the inputs of a multiplexer 10 whose output is connected to an analog-to-digital converter 11. The multiplexer 10 can be dispensed with when a separate analog-to-digital converter is provided for each probe. The digital data words produced by the analog-to-digital converter 11 are applied to an image processing unit 12 which comprises inter alia an image processor and a semiconductor memory for storing at least one X-ray image. The image processing unit enables output of an X-ray image on a monitor 13. The entire process is controlled by a control processor 14.

The invention described thus far is known from EP-OS 219 897 and EP-OS 456 322. Reference is specifically made to these publications.

Strip-shaped artefacts could appear in the X-ray images thus formed. Such artefacts may be due to different probe sensitivities but also to different frequency-dependent transfer functions of the individual probes in conjunction with the subsequent amplifiers. The invention utilizes the recognition of the fact that these causes do not change from one X-ray image to another, but remain stable over a prolonged period of time. Therefore, during a test mode correction data can be determined in order to eliminate the image artefacts, said correction data being stored and the stored correction data being applied to the image data of subsequent X-ray images in order to eliminate the artefacts. This test mode can be repeated at given time intervals, for example once a day, in order to take into account any fluctuations.

The determination of correction data (correction factors) will be described in detail hereinafter with reference to FIGS. 2a–2d, said correction data being used to compensate for the different probe sensitivities or the fluctuation of the sensitivity of a probe during the scanning of a line.

In the test mode first the photoconductor 1 is charged in the same manner as in the mode for forming X-ray images. To this end, the voltage $U_o$ is applied to the substrate, after which charging takes place by means of the corona charging device 6. At the end of the charging operation, the potential across the entire surface of the photoconductor 1 amounts to zero volts. Because the device 7, 8 is grounded, no potential difference exists between the surface of the photoconductor and the probe, so that no charge carriers are influenced on the active surface of the probe and the amplifier 8 does not supply an output signal.

After the charging of the photoconductor surface, the substrate potential is decreased (or increased) by a constant amount. To this end, the substrate voltage is derived from a voltage divider 15 which is connected to the constant supply voltage $U_o$ ($-1500$ V) and which is proportioned so that its tapping carries a voltage which amounts to, for example 90% of the voltage $U_o$. The tapping is connected to the supply voltage terminal via a switch 16 which can be controlled by the control processor 14. The switch 16 is closed during the charging operation, so that the substrate potential is $U_o$, and is opened after the charging operation, so that the potential decreases to 90% of $U_o$. After the reading of the test data of a line, the switch 16 is closed again, and is opened again in order to determine the test data of a further line.

The lowering of the substrate potential causes the potential across the entire surface of the photoconductor to be decreased by the same amount. FIG. 2a shows the variation in time of the surface potential U.

The line-wise reading of the surface by the probes commences already before the variation of the substrate potential, the drum then rotating and the probes being displaced in the axial direction over each time one pixel per revolution. The reading of the photoconductor should be performed so that first the areas which are not exposed to radiation during an X-ray exposure are read, the area of the individual lines intended for the X-ray images being reached only after a delay which is sufficient to allow for equalizations and the like.

In the ideal case the voltage V(x) supplied by the probe should have the value zero before (and after) the lowering of the substrate potential and should have a constant value during the lowering of the substrate potential. In reality, however, the voltage V(x) varies in space as shown in FIG. 2b, the parameter x denoting the position of the scanned pixel in a line which is measured by the angle detector 5. It appears that prior to and after the lowering of the potential the voltage V(x) deviates from zero. These deviations are due to offset effects as well as drift effects during the reading of a line. However, from the magnitude of these deviations before and after the lowering of the potential for each pixel the magnitude of the offset and the drift effect can be determined and be compensated for by linear interpolation in the image processing unit 12.

FIG. 2c shows the sequence of the digital test data T(x) occurring after the digitization and the described offset and drift compensation of the signal V(x) in FIG. 2b. It appears that the test data is still not constant after this compensation, but varies in the x or line direction. These variations are due to variations of the distance between the probe and the surface of the photoconductor during rotation of the photoconductor device 1, 2. These distance fluctuations themselves are due to the fact that the surface of the photoconductor is not exactly cylindrical relative to the axis and that the substrate 2 is not journalled exactly on the axis 4.

The magnitude of the test data is a measure for the sensitivity of the probe in the various pixels. This variation of the sensitivity occurs also during subsequent X-ray exposures. The test data, therefore, can be used for correction by deriving therefrom correction factors which are inversely proportional to the test data. When the image data of subsequent X-ray images are multiplied by said correction factors, the image data thus corrected will be independent of the sensitivity fluctuations of the probe.

Thus, the following expression holds for the correction factor k(x,y):

$$k(x,y) = T_r/T(x,y) \qquad (1)$$

Therein, T(x,y) is the test data for the pixels having coordinates x,y and $T_r$ is a reference value which is the same for all probes. The value $T_r$ can be calculated as an arithmetical mean of all test values; however, it can also be defined at random, for example so that the numerical values for k(x,y) are situated in a particularly attractive range. Because the correction factors are calculated in conformity with the equation (1) from the test data T(x,y) of all probes, sensitivity differences between the individual probes, caused by different probe apertures or different input capacitances, are also equalized.

The correction factors k(x,y) thus determined in the image processing unit 12 during the test phase are stored in a memory 17. During a subsequent X-ray exposure they are used to correct the image data B(x,y) then produced, resulting in corrected image data $B_c(x,y)$ in conformity with:

$$B_c(x,y) = k(x,y) * B(x,y) \qquad (2).$$

In conformity with the equation (2), it is necessary per se to determine and store a correction factor k(x,y) in the described manner for each pixel (x,y) in the area covered by a probe. However, it has been found that the sensitivity of a probe changes comparatively little in the direction of the axis 4, i.e. in the y direction. Therefore, it is sufficient to determine the test data for each probe for one line only and to calculate the correction factors for this line therefrom, followed by storage. This set k(x) of correction factors for one line (also referred to hereinafter as the "correction vector") can be used to calculate the correction vectors for all other lines y of the image in conformity with the equation:

$$k(x,y) = k(x) \qquad (3).$$

FIG. 2d shows the correction vector thus calculated for the n pixels of a line (n being, for example 2000). In the relevant pixels the correction factors constituting the correction vector are inversely proportional to the test data of FIG. 2c.

In the case of a correction using only one correction vector per probe, in given circumstances small artefacts could occur, notably at the edges of the area covered by a probe. The accuracy can be improved by determining a respective correction vector $k_1(x)$ and $k_2(x)$ for two lines, preferably the two lines at the edges of the area, which correction factors are stored in the memory 17, the correction factors k(x,y) being determined, after an X-ray exposure, from these two correction vectors by interpolation in conformity with the equation $$k(x,y) = k_1(x) + (k_2(x) - k_1(x))*(y - y_1)/(y_2 - y_1) \qquad (4)$$

$y_1$ and $y_2$ denote the position of said lines within the area covered by the probe, whereas y denotes the line in which the pixel for which a correction factor is to be determined is situated.

The described correction enables elimination of all artefacts stemming from unequal sensitivities or sensitivity fluctuations. However, it has been found that there are also artefacts which are caused by the fact that the probe signal does not exactly represent the variation in time of the surface potential during reading. For example, there are probes having a differentiating characteristic which, in the event of a potential step on the photoconductorsurface, produce an output signal which first exceeds the steady value and subsequently decreases exponentially to the steady value.

FIG. 3a shows a potential step on the surface of the photoconductor 1 having a rectangular shape as a function of time. This potential step can be produced by opening the switch 16 at the instant t=t0 and closing it at the instant t=ts. The voltage V at the output of the amplifier 8 then varies as shown in FIG. 3b. The voltage V exceeds the steady value $V_s$ by the amount v at the instant t0 and subsequently decreases exponentially to the steady value $V_s$ again. At the trailing edge at the instant t=ts, the voltage V exceeds the zero point, by the same amount as it previously exceeded the steady value $V_s$, and subsequently decreases to zero again with the same time constant as during the squarewave pulse. The magnitude of v as well as the time constant of the decreases of the overshoot differ from one probe to another. Contrary to the representation in the drawing, the height of the overshoot v is substantially smaller than the steady value $V_s$; v amounts to approximately 5% of $V_s$.

Figure 4:
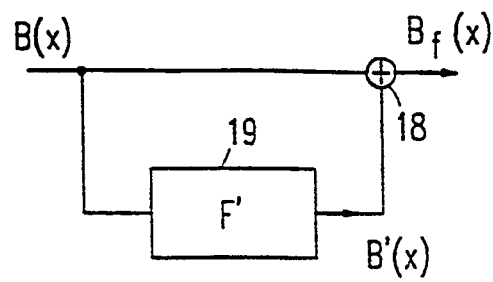
FIG. 4 shows a digital filter for processing the filter coefficients determined.

The described frequency-dependent signal distortions are eliminated during a later X-ray exposure by the filter device shown in FIG. 4, all image value B(x) succeeding one another in the line direction being applied to said filter device. The filter comprises an adder 18 which adds the input signal B(x) and a signal B'(x) filtered by a digital filter 19, so that the output signal $B_f(x)$ is:

$$B_f(x) = B(x) + B'(x) \qquad (5).$$

The digital filter 19 is a first-order recursive filter whose output value B' is determined by the variation of its input values. From the input value B(x), the previous input value B(x−1) and the previous filter value B'(x−1), this filter determines the current filter value B'(x) in conformity with:

$$B'(x) = a(B(x) - B(x-1)) + b*B'(x-1) \qquad (6).$$

When the filter coefficients a and b are suitably chosen, the signal B'(x) corresponds to the relevant overshoot, be it with the opposite polarity, so that the overshoot is no longer present in the signal $B_f(x)$ after addition of B(x) and B'(x). Evidently, filtering is effective also when the potential on the surface of the photoconductor does not change in a step-like manner but in conformity with the image contents.

The described digital filter can be implemented by means of a digital circuit consisting of adding, subtraction and delay members. The digital filtering process, however, can also be performed by way of a filter algorithm in the image processing unit 12 programmed in conformity with the equations (5) and (6).

The filter coefficient a follows from the quotient $v/V_s$, i.e. it represents the relative amplitude of the overshoot. The value b represents the ratio of two successive sampling values. It is always smaller than 1 and constant for a given sampling frequency. However, when the sampling frequency at which the analog-to-digital converter converts each individual signal into a series of digital data words changes, b also changes; when the sampling frequency decreases, b also decreases.

The determination of the specific filter coefficients a and b for the relevant probe will be described in detail hereinafter with reference to FIG. 3.

As is the case for the determination of the correction factors for equalization of different probe sensitivities, first the drum is charged until ground potential is present across the entire surface of the photoconductor. The switch 16 is closed during this operation. Subsequently, the switch is opened at the instant t0 and closed again at the instant ts, so that the surface potential varies in time as shown in FIG. 3a.

The variation in time of the analog signal V supplied by the probe is sampled before and after one of the potential steps, preferably on the trailing edge at the instant t=ts, the signal being converted into a series of digital data words. During this read operation, the photoconductor arrangement could in principle be stationary, but in that case it would not be possible to derive the clock pulses for the analog-to-digital converter 11 from the signals of the angle detector 5, instead they should then be generated by a separate clock generator. In order to avoid this, said read operation is performed with a rotating photoconductor arrangement 1, 2; at the instant t=ts, a pixel situated within the photoconductor area exposed during an X-ray exposure should then be read.

The probe signal then varies in dependence on the location x. Therefore, the previously determined correction factors k(x) must be applied thereto so as to suppress the signal falsifications occurring due to sensitivity fluctuations of the probe in the event of a rotating drum. The offset and drift effect must be compensated for in advance as described with reference to FIG. 2b. The signal falsifications stemming therefrom have been omitted in the representation of the probe signal of FIG. 3b for the sake of clarity.

FIG. 3c shows the variation of the test data T(x) appearing after digitizing and representing the variation in time or space of the surface potential in the relevant line, without the described disturbing effects. The test value occurring for the instant t=ts or for the pixel read at that instant can be simply determined from the series of test data by numerical differentiation. This test value, representing the amplitude of the overshoot v, is normalized to the preceding test value which corresponds to the steady value $V_s$. The quotient $v/V_s$ forms the filter coefficients a, whereas the value b can be determined as the quotient $T(x)/T(x-1)$ of two test values $T(x-1)$ and $T(x)$ which succeed one another after the instant t=ts.

The filter coefficients a, b thus individually determined for all probes are also stored in the memory 17 and used, after subsequent X-ray exposures, for the linewise filtering of the image signals in conformity with the equations (5) and (6).

The invention has been described on the basis of a cylindrical photoconductor. The invention, however, can also be used for a flat photoconductor arrangement.

What is claimed is:

1. A method of generating X-ray images by means of a photoconductor (1) which is provided on a conductive substrate (2) and whose surface potential can be read by means of probes (7), comprising:
   a) charging the photoconductor to a defined potential;
   b) varying the substrate potential and reading a potential variation (U) thus caused on the photoconductor surface;
   c) generating test data (T(x)) which corresponds to the spatial and/or temporal variation of the potential on the surface of the photoconductor;
   d) determining correction data (a, b, k(x)) which compensates for a deviation of the test data from its ideal value;
   e) storing the correction data;
   f) exposing said photoconductor to X-ray radiation;
   g) reading by means of said probes, as image data (B(x,y)), the surface potential for pixels on the surface of the photoconductor; and
   h) correcting the image data (B(x,y)) read by taking into account the stored correction data.

2. A method as claimed in claim 1, wherein:
   a) said varying the substrate potential is by a constant amount;
   b) said determining correction data comprises determining associated correction factors (k(x)) for pixels on at least a portion of the photoconductor surface in dependance on a quotient ($T_r/T(x)$) of a reference value ($T_r$) being the same for all pixels and the test data (T(x)); and
   c) said correcting comprises applying associated correction factors (k(x)) derived from the determined correction factors to the image data (B(x,y)) read after an X-ray exposure so that there is obtained corrected image data ($B_c(x,y)$) which is proportional to the image data (B(x,y)) and inversely proportional to the test data (T(x)).

3. A method as claimed in claim 2, wherein for each probe (7) correction factors k(x)) are determined for at least one line of an X-ray image and stored as said correction data, the image data (B(x,b)) of all lines being subjected to correction factors derived from the stored correction data.

4. A method as claimed in claim 3, characterized in that for each probe the correction factors ($k_1(x)$; $k_2(x)$) are formed for two non-adjacent lines, the correction factors for the other lines of this probe being derived by interpolation from the correction factors (k(x)) of the two lines.

5. A method as claimed in claim 1, characterized in that after the charging the substrate potential is varied in a step-like manner by a constant amount filter coefficients (a, b) for a digital filtering operation being determined from the magnitude and the variation of the test data (T(x)) thus successively determined in time, the filter coefficients (a, b) being stored and, during a subsequent X-ray exposure, the image data (B(x,y)) of all lines read by the same probe being subjected to a filtering operation taking into account the stored filter coefficients.

6. A device for generating X-ray images, comprising a photoconductor provided on a conductive substrate, a probe device for reading, as image data, a surface potential of the photoconductor, a charging device for charging the surface of the photoconductor, an image processing unit for reconstructing an X-ray image from the image data supplied by the probe device, means for varying a substrate potential by a constant amount so that test data is supplied by said probe device, means for generating correction factors from the supplied test data, a memory for storing correction factors derived from the test data, and an image processing unit for applying corrections derived from the stored correction factors to the image data of an X-ray image in order to reduce artifacts.

7. A device as claimed in claim 6, characterized in that for each probe the memory stores correction factors for at least one line, of an X-ray image, there being provided means for deriving correction factors for pixels in other lines from the stored correction factors for pixels on the same surface line.

* * * * *